June 13, 1961 L. F. HOLLAND 2,988,382
MOTORCYCLE TRAILER
Filed Oct. 28, 1959

INVENTOR.
Louis F. Holland.

United States Patent Office
2,988,382
Patented June 13, 1961

2,988,382
MOTORCYCLE TRAILER
Louis F. Holland, 2709 S. State St., Springfield, Ill.
Filed Oct. 28, 1959, Ser. No. 849,388
4 Claims. (Cl. 280—400)

This invention relates to trailers, and more specifically to trailers for the conveyance of motorcycles.

Motorcycles continue to increase in popularity for both recreational and entertainment purposes. It is often desired to transport a motorcycle from one location to another, and a standard two wheel trailer is perhaps the most common method adopted. Such trailers are used for want of more suitable equipment. A standard trailer presents a considerable loading and unloading problem, and is often unstable due to the high center of gravity of the payload. These trailers also require considerable storage area. Attempts have been made to provide appartus for towing motorcycles, but such attempts have not been accepted as satisfactory for several reasons. The main objections may be summarized as follows. The towing devices utilize the rear wheel of the motorcycle, such practice results in excessive tyre wear, and may cause bearing damage, since axial forces will be induced during turning. Bearings for motorcycles are designed principally for radial loads, as the cycle normally slopes into the curve during turning. Another unsatisfactory feature results from supporting and stabilizing the cycle by the front forks. This practice not only applies abnormal loads on the steering column bearings, but can actually throw the front and rear wheels out of alignment, which results in dangerous and unpredictable steering properties.

It is therefore a primary object of my invention to provide a motorcycle trailer which overcomes the disadvantages mentioned above.

It is also an object of my invention to provide a trailer of the above class which may be dismantled and transported in the trunk of a car.

It is a further object of my invention to provide a trailer of the above class which may be simply loaded and unloaded by one person.

It is yet a further object of my invention to provide a trailer of the above class which may be used as a tow bar for a motorcycle in the event of a puncture or other fault occurring while in transit.

The invention consists of a shaped U-bar, supported in the centre by a wheel connected beneath the U-bar. Towing connection means are provided at one end of the bar which permit horizontal and vertical angular displacement of the free end of the bar with respect to the car. Securing means are provided which secure the cycle in a rigid vertical location without utilizing the front fork assembly as part of the supporting structure. Means are also provided for loading and unloading the cycle, and the complete assembly is designed so that it may be readily broken down for transportation purposes.

Further objects and advantages of the invention will become apparent from the following detailed description of a preferred embodiment thereof, when taken in conjunction with the attached drawings wherein.

Like reference characters indicate corresponding parts throughout the several views in the drawing.

Figure 1:
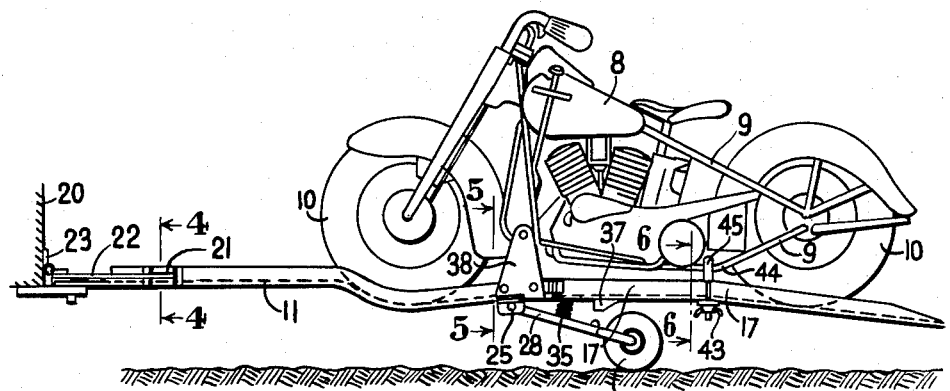
FIG. 1 is a side elevation of a motorcycle mounted ready for transportation on the trailer.
Figure 2:
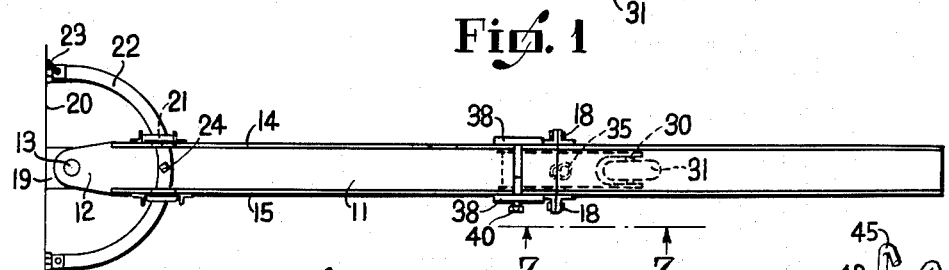
FIG. 2 is a plan view of the motorcycle trailer and towing connection.
Figure 3:
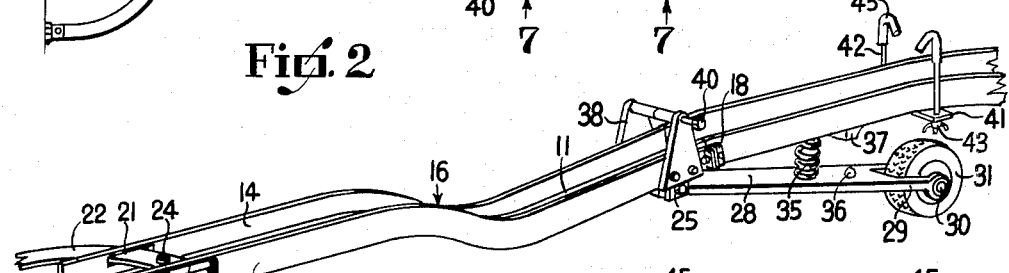
FIG. 3 is a perspective view of the trailer.
Figure 4:
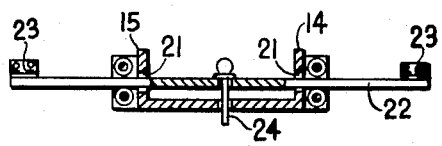
FIG. 4 is an end sectional elevation of the towing attachment taken along the line 4—4 of FIG. 1.
Figure 6:
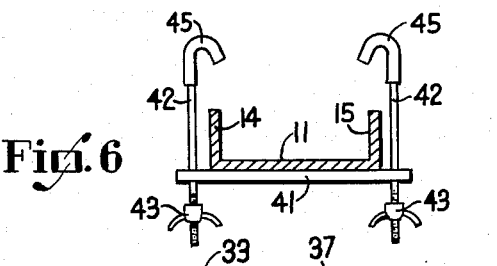
FIG. 6 is a front elevation partly in cross section of the rear means for securing the cycle to the trailer, taken along the line 6—6 of FIG. 1.
Figure 5:
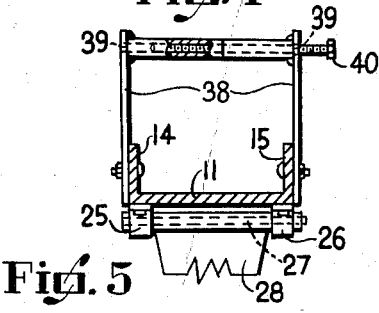
FIG. 5 is a front elevation of the forward means of securing the cycle to the trailer taken along the line 5—5 of FIG. 1.
Figure 7:
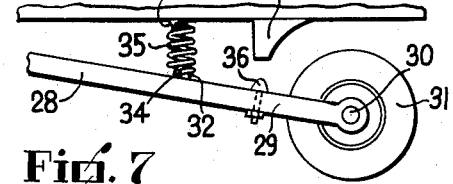
FIG. 7 is a side elevation of the trailer support wheel and spring taken along the line 7—7 of FIG. 2.

Referring now to the drawing, the numeral 8 represents a motorcycle having a frame 9 and wheels 10. A U-sectioned channel 11 has a horizontally projecting tongue 12 containing a hole 13 formed at the forward end. The channel having two sides 14 and 15 projecting upwardly, is bent downwardly at 16 and then shaped to form a slight convex curve 17. The channel is constructed in two members which bolt together by utilizing coupling flanges 18 welded to both sides of one end of each channel member.

The tongue 12 is adapted for attachment to a standard towing shackle 19 located on the center of the rear bumper 20 of a car. Two slots 21 are cut horizontally near the ends of the channel sides 14 and 15. The slots are adapted to receive a semi-circular stabilizer bar 22, which is hinged at each end to the bumper by hinges 23, and permits a vertical rotative movement of the bar relative to the bumper. A loading pin 24 passes through the centre of the bar and the bottom of the channel 11 to prevent horizontal movement of the channel relative to the car during loading and unloading. The above described fittings permit a vertical displacement of the free end of the channel together with rotative movement in a horizontal plane. The stabilizer bar restricts the channel from rotative movement about its own axis.

The channel 12 has two ears 25 projecting downwardly from each side of the center thereof. The ears have bushings 26 which receive a bearing pin 27 mounting one end of a wheel support leg 28. The free end of the leg 28 terminates in two extending arms 29. A pair of aligned openings in the end of the leg receive the axle 30 of a pneumatic wheel 31. A lug 32 projects from the top surface of the leg 28 vertically beneath an opposing lug 33 disposed on the underside of the channel 11. Holes 34 are drilled in each lug to connect with a shock absorber. Surrounding the shock absorber and mounted over the two lugs 32 and 33 is a compression spring 35. A rubber bumper 36 is bolted to the leg 28 for engagement with a projection 37 under abnormal shock conditions. The projection 37 is shaped in an arcuate manner at one end to serve as a mud shield for the wheel 31.

A forward motorcycle securing device comprises two triangular plates 38 bolted to each channel side wall and having a corner of the triangle disposed above the side wall. Two aligned openings 39 are disposed at the top of the plates to receive a bolt 40. The plates are adapted to embrace the ends of a bushing on a motorcycle, and are rigidly secured thereto by the bolt 40. The bushing is normally that which is provided for the attachment of side cars, and is located on the lower front portion of the motorcycle frame.

A rear motorcycle securing device consists of a plate 41 disposed across the underside of the channel 11, having two vertically disposed adjustable clamping hooks 42 projecting through a hole in each end. Two wing nuts 43 control the extension of the clamp hooks 42 which may be tightened to clampingly engage with horizontally disposed tubular framework 44. A rubber sleeve 45 may be installed on the end of hooks 42 to prevent paint damage to the cycle framework.

In operation, the trailer is secured to the rear bumper of a car, and the loading pin 24 is engaged in position to maintain the trailer in line with the car for loading. The second channel member may now be secured by bolting coupling flanges 18 together. The end of the trailer now rests on the ground and forms a ramp up which the motorcycle may be driven or pushed. The cycle is advanced until the front wheel lies in the small well provided by the shaping at 16. The bolt 40 is now passed through the openings 39 and the bushing provided on the motorcycle. The cycle will now remain upright without further support while the rear clamp assembly is secured. The hooks 42 of the clamp engage over frame members forward of the rear wheel and are tightened by turning wing nuts 43. The end of the ramp or channel is now placed over the toe of a standard bumper jack and is lifted to sufficient height to enable the installation of the leg 28 containing the trailer wheel 30. The spring 34 and the shock absorber are located in position and the trailer may then be lowered until supported by the wheel 30. The loading pin is now removed from the channel, and the trailer is ready for the road.

Unloading is carried out in the same maner by reversing the sequence of operations.

The above device provides an excellent motorcycle trailer which is stable at all normal road speeds, and which will convey the cycle to the desired destination without causing damaging stresses and wear.

In the event of a blow-out or puncture in the trailer wheel, the trailer may be temporarily adapted as a tow bar. The wheel leg is removed together with the rear channel section, and the rear clamping attachment. The motorcycle remains secured to the front channel section, and the rear wheel of the cycle runs on the road. This method should be used in emergency only, for reasons already explained.

Having described my invention with considerable particularity, it should be understood that various modifications may be made to structural details without departing from the scope and spirit of the invention as defined by the following claims.

I claim:

1. A motorcycle trailer comprising, a channel having upwardly extending side walls adapted to receive the wheels of a motorcycle, a hole in the end of said channel for engaging with a tow bar of a towing vehicle, a semicircular stabilizer bar hinged at each end to said tow bar and disposed in a horizontal plane passing through slots formed in the forward ends of said channel side walls, a pneumatic wheel mounted below said channel beneath the motorcycle, and securing means for rigidly fastening the forward and rear sections of said motorcycle framework to said channel side walls.

2. A motorcycle trailer comprising, a channel having upwardly extending side walls adapted to receive the wheels of a motorcycle, towing means securing the forward end of said channel to a towing vehicle, a leg pivotably mounted at one end to the underside of said channel and rotatably supporting a pneumatic wheel at the other end, a compression spring disposed between the central portion of said leg and the underside of said channel, and securing means for rigidly fastening the forward and rear sections of said motorcycle framework to said channel.

3. A motorcycle trailer comprising, a channel having upwardly extending side walls adapted to receive the wheels of a motorcycle, towing means securing the forward end of said channel to a towing vehicle, a pneumatic wheel mounted below said channel and beneath the motorcycle, triangular plates secured to each side wall and projecting vertically to provide two aligned openings adapted to receive the ends of a retaining bolt which passes through a bushing attached to the frame of said motorcycle; a plate disposed horizontally beneath the rear portion of said channel having upwardly extending clamping hooks passing through holes in each end of said plate and adjustably engaging with rear portions of said motorcycle framework.

4. A motorcycle trailer comprising, a channel formed in two sections removably secured together, each section having upwardly extending side walls adapted to receive the wheels of a motorcycle, the forward section of said channel having a depression formed near one end thereof to form a wheel well for receiving one of said motorcycle wheels, said forwardly disposed section having towing means secured to the other end, the rearward section of said channel being formed in a convex shape, a pneumatic wheel mounted below said rearward channel beneath the motorcycle, and securing means for rigidly fastening the forward and rear sections of said motorcycle framework to said channel.

References Cited in the file of this patent

UNITED STATES PATENTS

| | | |
|---|---|---|
| 2,256,038 | Woodruff | Sept. 16, 1941 |
| 2,779,602 | Kimbro et al. | Jan. 29, 1957 |

FOREIGN PATENTS

| | | |
|---|---|---|
| 904,744 | Germany | Feb. 22, 1954 |
| 950,769 | Germany | Oct. 18, 1956 |
| 115,199 | Sweden | Oct. 16, 1945 |